Patented Jan. 25, 1944

2,340,280

UNITED STATES PATENT OFFICE 2,340,280

NONLIVERING COATING COMPOSITION

Herbert L. Wampner, Terre Haute, Ind., assignor to Commercial Solvents Corporation, Terre Haute, Ind., a corporation of Maryland No Drawing. Application September 11, 1941, Serial No. 410,439

4 Claims. (Cl. 106—182)

My invention relates to improvements in synthetic resin and cellulose ester bronzing lacquers. More particularly, my invention is concerned with the production of lacquers of this character which possess increased resistance to gelling or livering.

A relatively large number of synthetic resins, particularly those of the alkyd type, have been developed for use in the preparation of coating materials. Such resins, which are usually of the glycerol-phthalic anhydride type, have been modified by the introduction of drying oils, nondrying, or semi-drying oils, phenol-aldehyde resins, and the like, to improve their solubility in organic solvents and, in some cases, to impart drying or oxidizing properties thereto. All of these resins have found use as the basic film-forming ingredient of varnishes, or enamels, or as a supplementary film-forming ingredient in lacquers. It has been found, however, that lacquers of this type cannot be satisfactorily used in combination with bronze powders because of the pronounced tendency of the former to gel or liver under such conditions. Similar difficulties are encountered with cellulose ester bronzing lacquers.

The livering of coating materials of the above types may take the form of either gellation of the entire coating material or agglomeration of a part of the material into large particles, leaving the remainder as a liquid. The former is the more common form of this phenomenon but even in this case, agglomerates may be found in the gelled material. In the case of coating compositions containing relatively large amounts of bronze powders and/or various types of resins possessing livering tendencies, the gellation may occur shortly after the preparation of the coating material and nearly always within 24 hours. Certain factors such as the acidity of the various lacquer components, the quantity and composition of the bronze powders utilized, the temperature at which the bronzing lacquer is permitted to stand, etc., will, in general, determine the speed at which livering occurs.

It is an object of my invention to provide both synthetic resin and cellulose ester bronzing lacquers which possess a pronounced tendency to resist livering for a sufficient period of time to render the use of such lacquers practicable over extended working periods.

Previously it has been attempted to overcome these difficulties by modifying the resins contained in lacquers in which a synthetic resin or resins constituted the principal film-forming material. None of such attempts, however, has met with success. If the nature of the resin is changed in such a manner as to avoid livering, the desirable film-forming properties are also modified to such an extent that the composition is substantially useless for coating purposes. Efforts to avoid this difficulty by neutralizing the acidity of the resins have also met with failure.

The tendency of synthetic resin and cellulose ester bronzing lacquers to liver has recently been substantially reduced by the addition of a relatively small amount of malic acid to said lacquers during the formulation thereof. Although the latter process has met with a certain degree of success, it possesses certain drawbacks which render it impractical for numerous commercial applications. For example, because of the low degree of solubility of malic acid in the common organic solvents, it is difficult to prepare stock solutions of such bronzing lacquers to which malic acid has been added. Also, the increased acidity in the lacquer, due to the presence of malic acid, renders the use of such coating compositions highly impractical because of the deleterious effects that said compositions have upon metals. Furthermore, aluminum bronze which finds wide application in the coating field loses its leafing ability when present in synthetic resin or cellulose ester lacquers containing free malic acid.

I have now discovered that bronzing lacquers of the types mentioned above may be rendered highly resistant to gelling or livering by adding thereto, in small quantities, a neutral malic acid salt of an amino dioxane, said salt having the following structural formula:

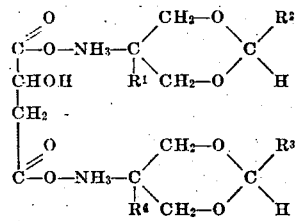

in which $R^1$ and $R^4$ may represent either hydrogen, hydroxy methyl or an alkyl group and $R^2$ and $R^3$ represent alkyl groups.

The quantity of the above-mentioned salts necessary to prevent livering or agglomeration of the coating material in general will be found to depend upon the amount of bronze powders employed and also upon the character of the film-forming agent utilized. In certain instances the tendency of such compositions to gel has been considerably decreased by incorporating therein as little as 0.07 per cent, based upon the weight of the solids present, of a neutral malic acid salt of the class mentioned above. Generally the use of from approximately 0.10 per cent to 2.0 per cent will be found adequate to prevent gelling during practical working periods.

In this connection it should be emphasized that as a direct result of the present invention it has also been made possible to prevent gelling of bronzing lacquers over extended periods of time, i. e., for the ordinary shelf life of the coating materials. This result may be accomplished by replacing at least a part of the plasticizer present by a concentrate containing a malic acid salt of the aforesaid type. Such concentrate may constitute the crude reaction mixtures resulting from the production of said malic acid salts, as described below. The composition and quantity of the concentrate required to render bronzing lacquers of the class described substantially permanently free from any tendency to gel or liver, will be found to vary with the composition of the lacquer. However, I have found that from about 25 per cent to 65 per cent of said concentrate, based upon the weight of the film-forming agent present, is generally sufficient to inhibit the occurrence of livering when the lacquers are stored over extended periods of time.

Bronzing lacquers in which these neutral salts of malic acid have been incorporated possess none of the previously-mentioned disadvantages exhibited by such compositions which employ malic acid as an anti-livering or anti-gelling agent. On the contrary, stock solutions of such lacquers may be readily prepared due to the high degree of solubility of the said salts of malic acid in organic solvents. Furthermore, coating materials which contain said salts do not attack metal surfaces and in addition, possess a high degree of color stability.

The coating compositions in which these salts of malic acid may be utilized as anti-gelling agents may be any of the usual types of lacquers or varnish base enamels. The lacquers may be prepared from cellulose esters of varying viscosities. For example, cellulose nitrate or cellulose acetate ranging in viscosity of from one-fourth second to twenty seconds or slightly higher are admirably suited for preparing the bronzing lacquers of my invention. The customary plasticizers such as butyl phthalate, cresyl phosphate, or castor oil, may be utilized. The solvents may be any of the usual esters, alcohols, ketones, ethers, etc., but care, of course, should be taken to avoid excessive proportions of the acid-containing materials since such substances tend to nullify the effect of the anti-gelling agents and to promote livering, particularly in coating compositions containing basic ingredients.

Any of the known types of bronze powders such as aluminum bronze, or bronze powders prepared from copper, brass, and the like may be employed. Suitable bronze powders for use in preparing bronzing lacquers contemplated by the present invention may be produced by utilizing the process of U. S. Patent No. 2,002,891 by E. J. Hall. According to this process the metal is reduced to flake-like particles by impact in a ball mill, and a lubricating agent, such as stearic acid, or palmitic acid, is incorporated in the powder during reaction, or during subsequent polishing.

The malic acid salts employed in the preparation of the non-livering coating compositions of the present invention may be produced in any convenient manner. For example, the desired amino dioxane and solvent mixture are mixed together after which malic acid is then slowly added thereto with thorough agitation which is continued until solution is complete. This procedure is preferably carried out at a temperature of 50–60° C. since such conditions tend to increase the rate of solution. The solvent mixture referred to above preferably consists of a suitable plasticizer such as butyl phthalate, a dihydric alcohol such as 2-methyl-2,4-pentanediol, together with a third solvent, for example, butyl carbitol.

The amino dioxanes which may be utilized in preparing the anti-gelling agents of the present invention include 2-propyl-5 - hydroxymethyl-5-amino-1,3-dioxane, 2-propyl-5-amino- 1,3 - dioxane, 2-(3-heptyl)-5-methyl-5-amino - 1,3 - dioxane, 5-ethyl-5-amino-1,3-dioxane, 5-methyl -5-amino-1,3-dioxane, and the like. These amino dioxanes may be prepared in accordance with any convenient method. I prefer, however, to produce such compounds by the procedure described in U. S. Patent No. 2,247,256, granted June 24, 1941, to Murray Senkus. In a process of this character the corresponding nitro dioxane is subjected to hydrogenation at a pressure of approximately 2,000 pounds per square inch and at a temperature of about 25° C. in the presence of a nickel hydrogenation catalyst, and a suitable solvent such as methanol. The nitro dioxane employed as the starting material in the above-mentioned process, may be conveniently prepared by heating equivalent quantities of a polyhydroxy nitro compound and an aldehyde in the presence of a small amount of an acid catalyst, such as hydrochloric acid, and, if desired, in the presence of organic liquid, such as benzene or toluene, which is capable of removing the water produced during the reaction in the form of a constant boiling mixture. This reaction is very general in character, and may be effected between a large number of aldehydes and polyhydroxy nitro compounds.

Other standard ingredients of synthetic resins and cellulose ester bronzing lacquers, may be incorporated in the lacquers in accordance with standard formulation procedures. Any of the standard plasticizers, resins, and the like, may be employed, but I prefer to employ ingredients which are not appreciably acidic in nature. This is particularly true with respect to resins, and I prefer for this reason to employ specific resins such as alkyd or phenol-aldehyde resins, which are, in general, more neutral in reaction than such materials as ester gum and the natural resins, especially where the coating of metal surfaces is involved.

The examples which follow are illustrative of the scope of the present invention.

*Example I*

A lacquer was prepared containing 10 parts by weight of one-fourth second nitro cellulose, 10 parts by weight of ester gum, and 5 parts by weight of butyl phthalate in 100 parts by weight of a solvent mixture of the following composition:

|  | Per cent by volume |
|---|---|
| Butyl acetate | 25 |
| Ethyl acetate | 15 |
| Ethyl alcohol | 5 |
| Toluol | 55 |

Copper bronze powder was then added to two samples of the clear lacquer prepared as described above, in a concentration of approximately 8 per cent by weight of the prepared lacquer, and to one of these samples was added 0.25 per cent by weight of 5-ethyl-2-heptyl-1,3-dioxane-5-ammonium malate, based upon the solids present. Each of the samples of bronzing lacquers was thoroughly mixed and permitted to stand for 24 hours, at the end of which time the samples were examined. The bronzing lacquer containing no 5-ethyl-2-heptyl-1,3-dioxane-5-ammonium malate had set to a thick gel, whereas the viscosity of the sample to which the 5-ethyl-2-heptyl-1,3-dioxane-5-ammonium malate had been added, remained substantially unchanged at the end of 72 hours.

*Example II*

A clear lacquer was prepared as described in Example I, substituting a phenol-aldehyde resin (Bakelite XR 3180) for ester gum. Copper bronze powder was added to two samples of this lacquer, in a concentration of approximately 8 per cent by weight of the prepared lacquer and 2-propyl-5-hydroxymethyl-1,3-dioxane-5-ammonium malate was added to one sample in a concentration of about two percent by weight of the solids present. Each of the samples of lacquer was thoroughly mixed and permitted to stand. After a period of 10 hours, the sample containing no 2-propyl-5-hydroxymethyl-1,3-dioxane-5-ammonium malate had set to a thick, viscous gel, whereas the portion of bronzing lacquers to which the 2-propyl-5-hydroxymethyl-1,3-dioxane-5-ammonium malate had been added, exhibited no substantial change in viscosity after four days.

*Example III*

| | Grams |
|---|---|
| Drying oil modified glycerol phthalate resin | 50 |
| Copper bronze powder | 20 |
| 2-Propyl-1,3-dioxane-5-ammonium malate | 1.5 |

In 100 cc. of xylol.

The above bronzing lacquer, after a period of three days, exhibited no substantial change in viscosity, whereas the same bronzing lacquer containing no 2-propyl-1,3-dioxane-5-ammonium malate had become so viscous at the end of eight hours that it was incapable of being applied by any of the customary methods of application.

*Example IV*

The following example demonstrates the ability of the malic acid salts of the present invention to inhibit livering in bronzing lacquers in which non-drying oil modified glycerol-phthalate resins are employed.

| | Grams |
|---|---|
| Non-drying oil modified glycerol-phthalate resin | 35 |
| Copper bronze | 20 |
| 2-(3-Heptyl)-5-methyl-1,3-dioxane-5-ammonium malate | 1.5 |

In 100 cc. of xylol.

The bronzing lacquer having the above composition retained a viscosity suited to the common methods of application for a period of three days, whereas the same bronzing lacquer which contained no 2-(3-heptyl)-5-methyl-1,3-dioxane-5-ammonium malate had set to a viscous gel after 10 hours.

The above examples are merely illustrative, and do not in any way limit the scope of my invention. As has been previously pointed out, the formulation of the bronzing lacquers may be varied in numerous respects in accordance with standard formulation procedures. The various embodiments of the present invention illustrated by the above examples are obviously subject to numerous modifications. Therefore, it is to be specifically understood that I do not desire to restrict myself to the particular bronzing lacquers and to the methods for obtaining the same, which have been set forth in the examples, but it is intended that the present invention shall include, by the terminology employed in the following claims, all features of patentable novelty inherent therein.

Having now described my invention, what I claim is:

1. A coating composition having reduced tendency to liver or agglomerate, which comprises a bronze powder, cellulose nitrate, and a neutral salt of malic acid of the following structural formula:

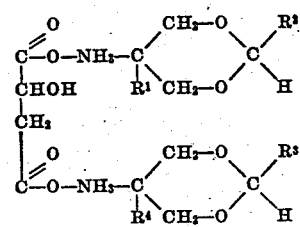

wherein $R^1$ and $R^4$ are members selected from a group consisting of hydrogen, hydroxymethyl, and alkyl, and $R^2$ and $R^3$ represent alkyl groups.

2. A coating composition having reduced tendency to liver or agglomerate, which comprises a bronze powder, cellulose nitrate and 2-propyl-1,3-dioxane-5-ammonium malate.

3. A coating composition having reduced tendency to liver or agglomerate, which comprises a bronze powder, cellulose nitrate and 2-propyl-5-hydroxymethyl-1,3-dioxane-5-ammonium malate.

4. A coating composition having reduced tendency to liver or agglomerate, which comprises a bronze powder, cellulose nitrate, and 5-ethyl-2-(3-heptyl)-1,3-dioxane-5-ammonium malate.

HERBERT L. WAMPNER.